(12) United States Patent  
Ghanbari et al.

(10) Patent No.: US 8,664,577 B1  
(45) Date of Patent: Mar. 4, 2014

(54) LONG RANGE HELIOSTAT TARGET USING ARRAY OF NORMAL INCIDENCE PYRANOMETERS TO EVALUATE A BEAM OF SOLAR RADIATION

(75) Inventors: Cheryl M. Ghanbari, Albuquerque, NM (US); Clifford K. Ho, Albuquerque, NM (US); Gregory J. Kolb, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 259 days.

(21) Appl. No.: 13/238,431

(22) Filed: Sep. 21, 2011

(51) Int. Cl.
   *G01C 21/02* (2006.01)
(52) U.S. Cl.
   USPC ........................................ 250/203.4; 250/205
(58) Field of Classification Search
   USPC ......... 250/203.4, 203.6, 214.1, 221; 126/581, 126/582, 569–578; 356/128
   See application file for complete search history.

(56) References Cited

U.S. PATENT DOCUMENTS

| | | | | |
|---|---|---|---|---|
| 4,609,288 A * | 9/1986 | Dodge | ........................ | 356/218 |
| 4,779,980 A * | 10/1988 | Hulstrom et al. | ............ | 356/218 |
| 5,005,958 A | 4/1991 | Winston et al. | | |
| 6,899,096 B2 * | 5/2005 | Nakamura | .................... | 126/581 |
| 2007/0157922 A1 | 7/2007 | Radhakrishnan et al. | | |
| 2009/0107485 A1 | 4/2009 | Reznik et al. | | |
| 2009/0217921 A1 | 9/2009 | Gilon et al. | | |
| 2009/0250052 A1 | 10/2009 | Gilon et al. | | |
| 2010/0139644 A1 | 6/2010 | Schwarzbach et al. | | |
| 2010/0191378 A1 | 7/2010 | Gilon et al. | | |
| 2010/0282242 A1 | 11/2010 | Gilon et al. | | |

* cited by examiner

*Primary Examiner* — Que T Le  
(74) *Attorney, Agent, or Firm* — Medley Behrens & Lewis LLC; Michael J. Medley; Olivia J. Tsai

(57) ABSTRACT

Various technologies described herein pertain to evaluating a beam reflected by a heliostat. A portable target that has an array of sensors mounted thereupon is configured to capture the beam reflected by the heliostat. The sensors in the array output measured values indicative of a characteristic of the beam reflected by the heliostat. Moreover, a computing device can generate and output data corresponding to the beam reflected by the heliostat based on the measured values indicative of the characteristic of the beam received from the sensors in the array.

19 Claims, 9 Drawing Sheets

LONG RANGE HELIOSTAT TARGET USING ARRAY OF NORMAL INCIDENCE PYRANOMETERS TO EVALUATE A BEAM OF SOLAR RADIATION

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Solar power towers are utilized to receive concentrated solar radiation to produce high-temperature thermal energy to generate utility-scale electricity or perform solar chemistry. To generate high thermal energy, solar power towers are located in fields that include numerous heliostats that collect and concentrate solar energy onto a central collector (e.g., solar receiver). For instance, the central collector is oftentimes mounted on top of the solar power tower. A heliostat includes, for example, a plurality of mirrored facets on a common frame that has two axis drives, such that the heliostat can track the sun over the course of a day. Current solar power tower fields include hundreds to thousands of heliostats. Moreover, solar power tower fields can include heliostats located at varying distances from the solar power tower. For example, the farthest heliostats from the solar power tower in some solar power tower fields can be at least a mile away from the solar power tower.

To obtain substantially optimal concentrated solar flux on the central collector from a heliostat, it is desirable for the heliostat to track and aim accurately since a very small error in tracking can result in a reflected solar beam that misses the central collector. Moreover, when a heliostat is positioned at a large distance from the solar power tower, a beam reflected by the heliostat commonly diverges and resulting irradiance on the central collector may be a fraction of one sun. Due to the divergence and low irradiance of the beam at large distances from the heliostat, however, it may be difficult to evaluate the beam from the heliostat.

Traditional approaches for evaluating a beam reflected by a heliostat commonly use a photographic flux image technique. When employing such an approach, incident solar radiation from the sun can be reflected by a heliostat. The heliostat can reflect the beam onto a target, wall, or other type of surface. Further, a camera can capture an image of the beam reflected off of the target, wall, or other type of surface. Moreover, a sensor such as a flux gauge can be employed to scale pixel values from the reflected image captured by the camera. However, as the distance between the heliostat and the target, wall, or other type of surface increases, the irradiance from the beam received at the camera can decrease. Accordingly, as the irradiance decreases, it becomes more difficult to distinguish the beam reflected by the heliostat from ambient light in the reflected image captured by the camera, thereby detrimentally impacting an ability to evaluate the beam reflected by the heliostat.

SUMMARY

Described herein are various technologies that pertain to evaluating a beam reflected by a heliostat. A portable target that includes a plurality of sensors is configured to capture the beam reflected by the heliostat. The heliostat and the portable target can be positioned such that the heliostat reflects a beam of solar radiation towards the portable target (e.g., the plurality of sensors of the portable target). The plurality of sensors can include substantially any number of sensors. According to an example, the sensors can be silicon-detector-based collimated pyranometers or silicon-detector-based pyrheliometers. Moreover, the sensors can be arranged in a plane that is approximately transverse to a propagation path of the beam. The sensors output measured values indicative of a characteristic of the beam reflected by the heliostat. For example, the sensors can output measured values indicative of irradiance of the beam from the heliostat. Moreover, a computing device can generate and output data corresponding to the beam reflected by the heliostat based on the measured values indicative of the characteristic of the beam received from the sensors in the array. By way of example, the data can include a peak irradiance of the beam, a total power of the beam, an average irradiance of the beam, an average power of the beam, an irradiance distribution of the beam, a centroid of the beam, and so forth.

In accordance with an example, the sensors mounted on the portable target can measure direct normal irradiances of the beam reflected by the heliostat. Thus, the portable target can enable characterizing a quality of a beam reflected by the heliostat at larger distances compared to conventional approaches that employ the photographic flux image technique. According to an example, the plurality of sensors affixed to the portable target can be configured to capture the beam reflected from the heliostat and output measured values indicative of a characteristic of the beam when the heliostat and the portable target are separated by at least one half of a mile. By way of another example, the plurality of sensors affixed to the portable target can be configured to capture the beam reflected from the heliostat and output measured values indicative of a characteristic of the beam when the heliostat and the portable target are separated by at least one mile.

By way of another example, the computing device can generate and output (e.g., display, retain in memory, transmit, etc.) a measured irradiance distribution of the beam reflected by the heliostat based upon the measured values indicative of the characteristic of the beam received from the sensors in the array. The computing device can further generate a theoretical irradiance distribution of an ideal beam as a function of a distance between the portable target and the heliostat and output the theoretical irradiance distribution of the ideal beam with the measured irradiance distribution of the beam from the heliostat. For instance, the measured irradiance distribution and the theoretical irradiance distribution can be rendered on a display monitor to a technician. Further, the measured irradiance distribution and the theoretical irradiance distribution can be compared, and information pertaining to performance of the heliostat can be outputted based at least in part upon the comparison.

Other aspects will be appreciated upon reading and understanding the attached figures and description.

DETAILED DESCRIPTION

Figure 1:
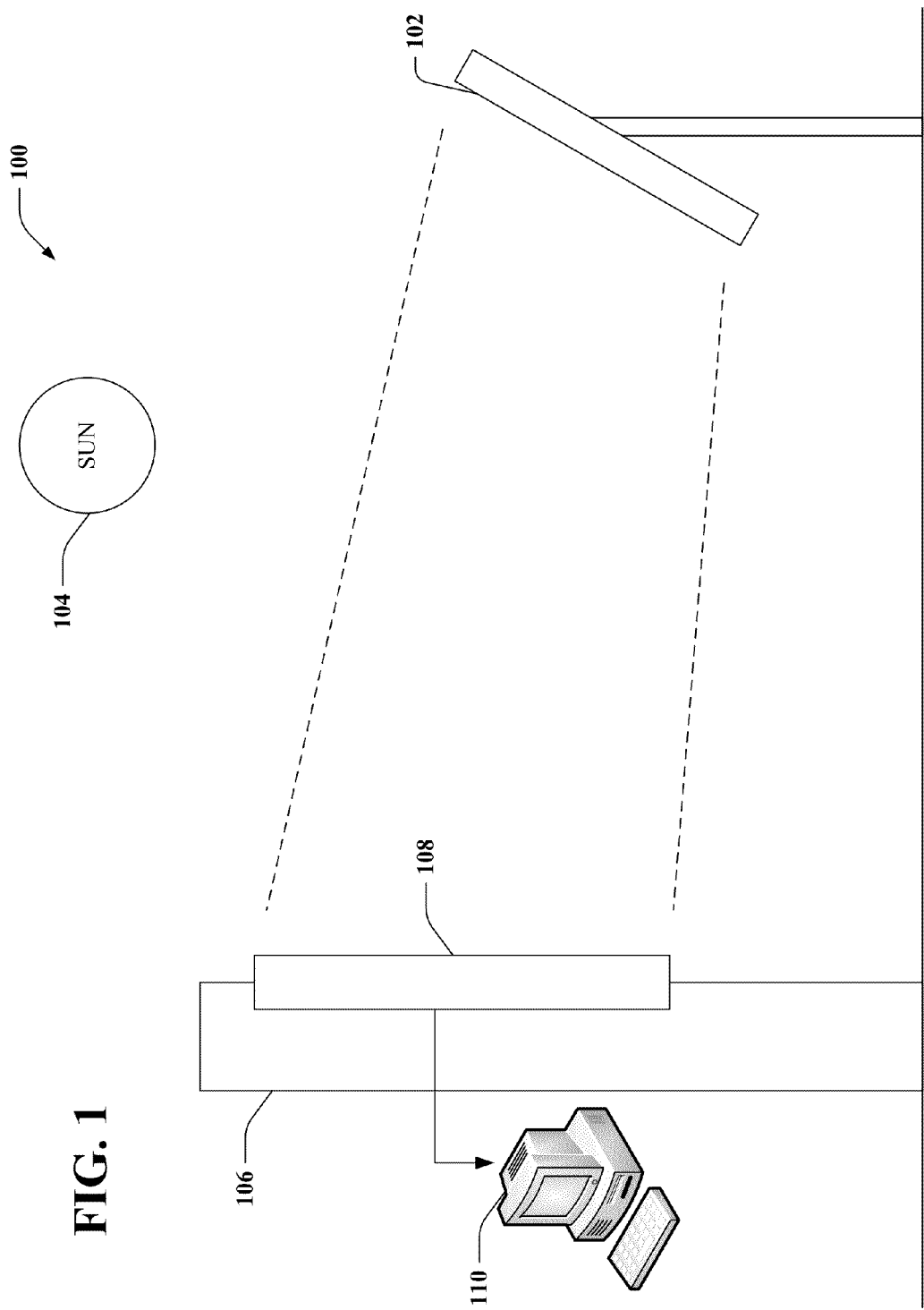
FIG. 1 illustrates an exemplary system that facilitates evaluating a beam from a heliostat.

Various technologies pertaining to evaluating beams from heliostats, which can be utilized in connection with solar power towers, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

With reference to FIG. 1, an exemplary system 100 that facilitates evaluating a beam from a heliostat is illustrated. The system 100 comprises a heliostat 102 that includes a plurality of mirrored facets. For example, in operation, the heliostat 102 comprises a frame that holds the plurality of mirrored facets, and the frame may be configured with two axis drives such that the heliostat 102 can track the movement of the sun 104 over the course of a day. The heliostat 102, in operation, is configured to reflect solar radiation received at the mirrored facets.

The system 100 further includes a portable target 106. The portable target 106 is positioned to face the heliostat 102. According to an illustration, the heliostat 102 can be configured to reflect a beam of the received solar radiation towards the portable target 106. The portable target 106 includes a plurality of sensors 108 configured to capture the beam reflected by the heliostat 102. By way of illustration, the plurality of sensors 108 can measure a characteristic of the beam reflected by the heliostat 102. An example of the characteristic of the beam that can be measured by the plurality of sensors 108 is an irradiance of the beam. An irradiance of the beam can also be referred to as a flux density of the beam. The plurality of sensors 108 can measure irradiance of the beam at an instant in time, as a function of time, or the like. The plurality of sensors 108 further output values indicative of the characteristic of the beam reflected by the heliostat 102. For instance, a sensor from the plurality of sensors 108 can measure the irradiance of a portion of the beam from the heliostat 102 incident upon the sensor. Further, the sensor can generate a signal that specifies the value of the measured irradiance of the portion of the beam. The signal, for example, can be a voltage, a current, or the like; however, it is to be appreciated that the signal is not limited to the foregoing examples.

The plurality of sensors 108 can be arranged on the portable target 106 in an array to capture a spatial profile of the characteristic of the beam reflected by the heliostat 102 at a particular plane that is approximately transverse to the beam propagation path. The plurality of sensors 108 in the array can be arranged in substantially any manner within the particular plane. For instance, the plurality of sensors 108 can be arranged to form a radial array, a cross-shaped array, an X-shaped array, an array with M columns and N rows (where M and N can be substantially any integers), and so forth. According to an example, the plurality of sensors 108 can output measured values indicative of irradiances of portions of the beam respectively incident there upon.

The plurality of sensors 108 can measure direct normal irradiance of the beam reflected by the heliostat 102. According to an example, the plurality of sensors 108 can include a plurality of silicon-detector-based collimated pyranometers. By way of another example, the plurality of sensors 108 can include a plurality of silicon-detector-based pyrheliometers. However, it is contemplated that the plurality of sensors 108 can include other types of sensors with fast response times (e.g., on the order of a tenth of a second or less, on the order of 10 µs, etc.).

The portable target 106 is moveable and can be positioned at substantially any arbitrary distance from the heliostat 102 to characterize the beam from the heliostat 102. For instance, the portable target 106 can be positioned at a location such that the portable target 106 and the heliostat 102 are separated by at least one half of a mile. By way of another illustration, the portable target 106 can be positioned at a location such that the portable target 106 and the heliostat 102 are separated by at least one mile. However, it is further contemplated that the portable target 106 and the heliostat 102 can be separated by less than one half of a mile. With the heliostat 102 and the portable target 106 separated by any of the foregoing distances, the plurality of sensors 108 affixed to the portable target 106 are configured to capture the beam reflected by the heliostat 102 and output the measured values indicative of the characteristic of the beam reflected by the heliostat 102.

A computing device 110 is in communication with the plurality of sensors 108 and can receive the measured values indicative of the characteristic of the beam reflected by the heliostat 102 from the plurality of sensors 108. For example, one or more of the sensors 108 can be in communication with the computing device 110 by way of a wired connection. According to another example, one or more of the sensors 108 can be configured with wireless communication functionality that causes the measured values captured by such sensors 108 to be transmitted by way of a wireless communications channel to the computing apparatus 110. In yet another exemplary embodiment, one or more of the sensors 108 and the computing device 110 can be integrated in a single computing device.

The computing device 110 is configured with computer-executable code that generates data corresponding to the beam reflected by the heliostat 102 based on the measured values indicative of the characteristic of the beam. Moreover, the computing device 110 can output the data corresponding to the beam reflected by the heliostat 102. In an example, the computing device 110 can receive the measured values indicative of the characteristic of the beam reflected by the heliostat 102 from the plurality of sensors 108. From the measured values indicative of the characteristic of the beam, the computing device 110 can determine data corresponding to the beam reflected from the heliostat 102 such as, for instance, a peak irradiance of the beam, a total power of the beam, an average irradiance of the beam, an average power of the beam, an irradiance distribution of the beam, a centroid of the beam, a combination thereof, or the like. By way of illustration, the data can be outputted by being rendered on a display monitor, retained in memory, transmitted to a disparate computing device, or the like.

The data generated by the computing device 110 can specify a quality of the beam from the heliostat 102. For instance, the data can be utilized to evaluate how well the heliostat 102 tracks on target, how well the beam shape holds together, how well the heliostat 102 withstands the wind, and so forth at various distances. According to an example, the computing device 110 can interpolate and characterize the measured values indicative of the characteristic of the beam (e.g., measured irradiance values) to produce an irradiance distribution. Moreover, a shape of the beam, an area of the beam, an offset of the beam, or the like can be determined from the irradiance distribution (e.g., by the computing device 110, visually by a technician if the irradiance distribution is rendered on a display monitor, etc.).

By way of illustration, the plurality of sensors 108 can produce measured values (e.g., Millivolt signals) indicative of irradiances of the beam respectively measured thereby. The measured values can be recorded by an on-board data acquisition system (e.g., included in the computing device 110, coupled to the computing device 110, etc.). The computing device 110 can convert the measured values to irradiances (e.g., fluxes, Watts per meter squared). The computing device 110 can further interpolate and characterize the irradiances to produce an irradiance distribution (e.g., flux map, measured irradiance distribution) of the beam. Thus, the entire beam from the heliostat 102 can be characterized using the measured values from the plurality of sensors 108, which are distributed in an array on the portable target 106. Moreover, as measured values indicative of the irradiances measured by the plurality of sensors 108 vary over time, the computing device 110 can generate time varying irradiance distributions (e.g., irradiance measured by the plurality of sensors 108 can change with time if the heliostat 102 is vibrating in the wind, etc.). Thus, the computing device 110 can generate data corresponding to the beam reflected by the heliostat 102 under different wind loading conditions, for instance. The computing device 110 can determine a peak irradiance of the beam, an average irradiance of the beam, and the like from the time varying irradiance distributions, for example. In accordance with another example, the computing device 110 can integrate the irradiance of the beam over the area of the beam to determine a total power of the beam. According to a further example, a peak power of the beam, average power of the beam, and the like can be generated by the computing device 110 from the time varying irradiance distributions. By way of yet another example, the computing device 110 can estimate a centroid of the beam from the distribution of irradiances from the plurality of sensors 108 or from the irradiance distribution. Further, the computing device 110 can evaluate tracking of the heliostat 102 from the time varying irradiance distributions (e.g., identify whether the heliostat 102 is drifting, overshooting, tilted, etc.). Since the portable target 106 can be moved, a larger range of motion of the heliostat 102 can be analyzed in a shorter period of time when evaluating the tracking of the heliostat 102 as compared to using a stationary target. It is also contemplated that any of the foregoing data can be generated by the computing device 110 from the irradiances produced by the computing device 110 converting the measured values rather than from the irradiance distributions.

As described above, the computing device 110 can generate a measured irradiance distribution based on the measured values indicative of the characteristic of the beam. Moreover, a theoretical model that predicts a theoretical irradiance distribution (e.g., DELSOL, ray-tracing, etc.) can, be incorporated into the computing device 110 to provide near-real-time analysis and evaluation of the quality of the beam reflected by the heliostat 102. According to an example, the computing device 110 can determine a theoretical irradiance distribution of an ideal beam as a function of specifications such as the distance between the heliostat 102 and the portable target 106, orientation of the heliostat 102 with respect to the portable target 106, the time of day, the geographic location (e.g., coordinates), and so forth. For instance, a distance between the heliostat 102 and the portable target 106 can be measured or known a priori. Further, the computing device 110 can perform a comparison between the measured irradiance distribution and the theoretical irradiance distribution of the ideal beam. The computing device 110 can output information pertaining to performance of the heliostat 102 based at least in part upon the comparison. For instance, the information pertaining to the performance of the heliostat 102 can be information utilized to adjust the heliostat 102, identify a cause of the error, quantize the error (e.g., a slope error of the heliostat 102 that would provide the measured irradiance distribution, etc.), and so forth.

In an exemplary embodiment, the computing device 110 may have a display monitor corresponding thereto, wherein the display monitor displays a visual representation of the measured irradiance distribution of the beam and the theoretical irradiance distribution of the ideal beam. According to another example, the display monitor can display the information pertaining to the performance of the heliostat instead of or along with the visual representation of the measured irradiance distribution of the beam and/or the visual representation of the theoretical irradiance distribution of the ideal beam. By way of another example, the display monitor can display other data generated by the computing device 110. For instance, the display monitor can be utilized by a technician that is adjusting the heliostat 102; thus, as the heliostat 102 is adjusted, the technician can be provided with updated visual feedback that can be utilized to adjust, correct, understand, etc. errors in the heliostat 102. It is contemplated that the computing device 110 can be a desktop computer employed proximate the heliostat 102 (e.g., in a factory setting). In another example, the computing device 110 can be a portable computing device, such as a laptop computer, portable telephone, or the like, and can be utilized by a technician in the field, factory setting, etc.

In another exemplary embodiment, the computing device 110 can be in communication with another computing device (not shown) that is utilized by a technician that is manually adjusting the heliostat 102. In such an example, the visual representations and/or information pertaining to the performance of the heliostat 102 are transmitted from the computing device 110 to the other computing device utilized by the technician.

In still yet another exemplary embodiment, adjustment of the heliostat 102 can be automatically undertaken without a technician. In such an embodiment, the heliostat 102 can include one or more actuators (not shown) operative to adjust the heliostat 102. The heliostat 102 can be configured to receive the information pertaining to the performance of the heliostat 102 (e.g., adjustments to be made to the heliostat 102) and automatically adjust the heliostat 102 via the actuator responsive to receipt of the information. For instance, the one or more actuators can be in communication with a microprocessor on the heliostat 102. Further, the microprocessor on the heliostat 102 can be in wireless communication with the computing device 110, and the information can be transmitted (e.g., wirelessly) to the microprocessor. The microprocessor can then send commands to an appropriate actuator to cause adjustment of the heliostat 102.

In contrast to conventional systems that employ a photographic flux image technique for evaluating a beam reflected by a heliostat by capturing an image of the beam reflected off of a target, wall, or other type of surface, the plurality of sensors 108 mounted on the portable target 106 in the system 100 can directly measure a characteristic of the beam from the heliostat 102. Thus, by directly measuring the characteristic of the beam, the system 100 can be more sensitive than such conventional systems that characterize the beam from the reflected image as a distance increases between the heliostat 102 and a location at which the beam is being characterized. Accordingly, the beam from the heliostat 102 can be characterized by the portable target 106 at greater distances compared to conventional approaches.

Moreover, since the portable target 106 is moveable, the portable target 106 can be placed in substantially any position relative to the heliostat 102 to be characterized. The moveable nature of the portable target 106 allows for the beam from the heliostat 102 to be characterized prior to operation of a power plant including the heliostat 102. Thus, a solar power tower need not be positioned proximate to the heliostat 102 when using the portable target 106 to evaluate the beam from the heliostat 102. By way of example, the portable target 106 can be utilized to characterize the beam from the heliostat 102 when evaluating a design of the heliostat 102, facets of the heliostat 102, or the like. According to another example, the portable target 106 can be employed to characterize the beam from the heliostat 102 during construction of a solar power tower field. However, it is further contemplated that the portable target 106 can be utilized to characterize the beam from the heliostat 102 after construction of a solar power tower field. For instance, when used to produce power, the heliostat 102 along with other heliostats in a solar power tower field can be oriented to reflect solar radiation towards a solar collector on a solar power tower (not shown). Moreover, the heliostat 102 can be reoriented (e.g., change the angle of) to reflect the solar radiation towards the portable target 106 when evaluating the beam from the heliostat 102 while the other heliostats in the solar power tower field can remain oriented to reflect solar radiation towards the solar collector on the solar power tower; thus, the other heliostats can continue to be utilized to produce power while the beam from the heliostat 102 is characterized. Thereafter, the heliostat 102 can again be reoriented to reflect the solar radiation towards the solar collector on the solar power tower. Accordingly, heliostats in the solar power tower field can be evaluated one at a time, where the heliostat (e.g., heliostat 102) being analyzed in the field can be aligned to the portable target 106 which is off line from the solar collector to mitigate intermixing of beams from other heliostat(s) with the beam from the heliostat being analyzed.

Moreover, it is to be appreciated that a solar power tower field can include the heliostat 102 and/or heliostats substantially similar to the heliostat 102. Generally, hundreds or thousands of heliostats can be positioned proximate to a solar power tower such that a significant amount of solar radiation is concentrated at the collector on the solar power tower. The solar radiation captured by the concentrator utilizes heat energy, for instance, to heat a liquid to transform the state of the liquid to a gas and drive a turbine. This in turn can be utilized to generate utility-grade electrical power.

Figure 2:
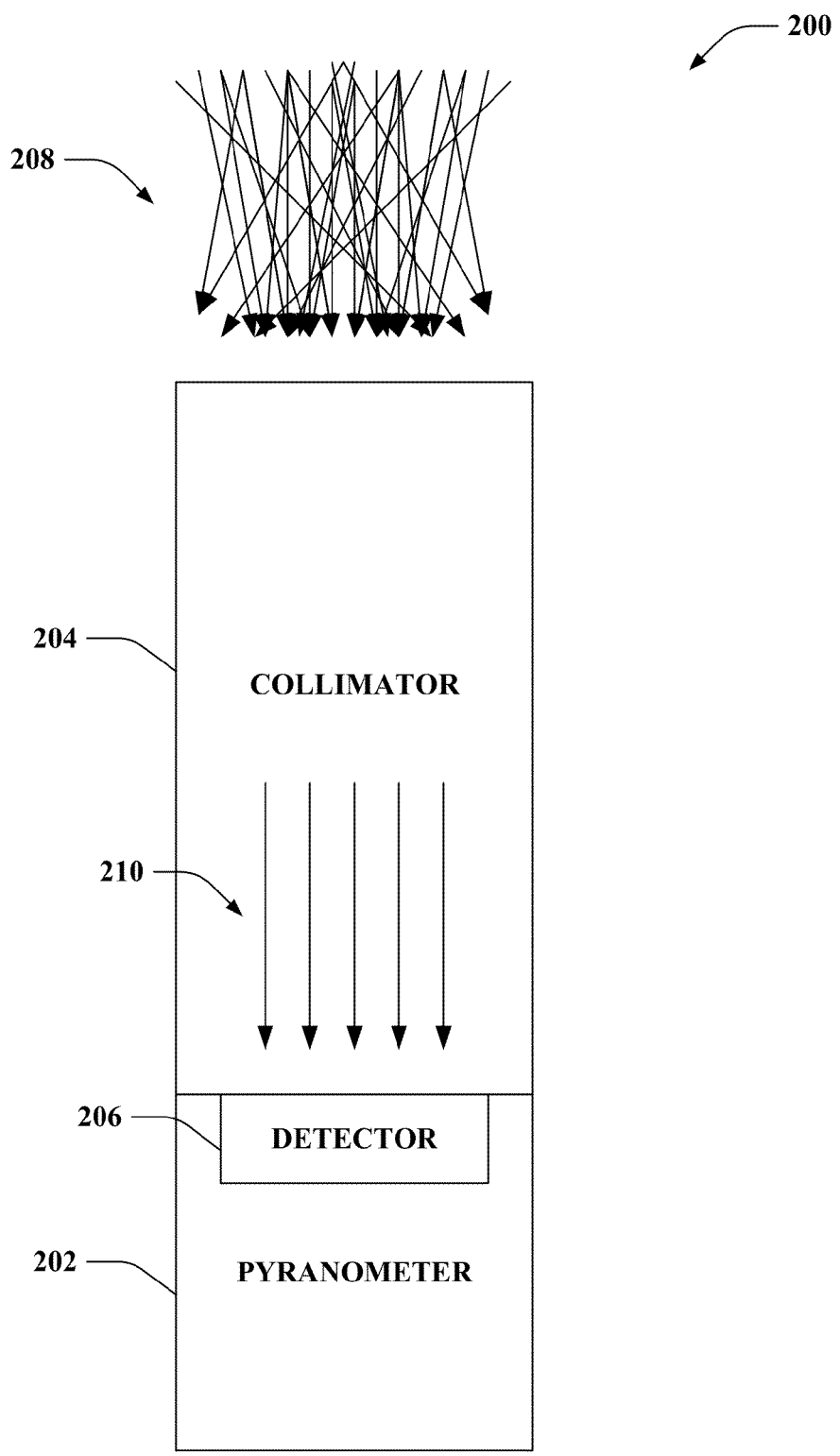
FIG. 2 illustrates an exemplary block diagram of a sensor that can be mounted on a portable target.

Now turning to FIG. 2, illustrated is an exemplary block diagram of a sensor 200 that can be mounted on a portable target (e.g., the portable target 106 of FIG. 1). The sensor 200 can be configured to capture a beam (or a portion thereof) reflected from a heliostat. Moreover, the sensor 200 can output a measured value indicative of a characteristic of the beam reflected from the heliostat. For example, the plurality of sensors 108 described above with respect to FIG. 1 can include a plurality of sensors substantially similar to the sensor 200.

The sensor 200 is a silicon-detector-based collimated pyranometer. The sensor 200 includes a pyranometer 202 with an attached collimator 204. The pyranometer 202 comprises a detector 206 that measures solar radiation flux density (e.g., irradiance). The detector 206 is a silicon photovoltaic detector. Similarly (although not shown), a silicon-detector-based pyrheliometer includes a silicon photovoltaic detector. In contrast, conventional pyranometers as well as conventional pyrheliometers typically include a thermopile sensor rather than a silicon photovoltaic detector. Moreover, although not depicted, a cosine-corrected acrylic diffuser can be affixed over the detector 206.

The pyranometer 202 is designed to measure hemispherical irradiance. The pyranometer 202 (e.g., without the collimator 204 attached thereto) can measure irradiance from a field of view of approximately 180 degrees. Further, the collimator 204 is a tube that includes internal baffles that narrows an acceptance angle allowed into the detector 206 of the pyranometer 202. Accordingly, a conical or narrow beam can be allowed into the detector 206 by the collimator 204 as opposed to hemispherical acceptance. Thus, with the collimator 204 attached thereto, the pyranometer 202 can measure irradiance of a beam from a focused source (e.g., the heliostat 102 of FIG. 1).

As depicted in FIG. 2, solar radiation 208 with a wide range of angles of incidence from various sources can be received by the collimator 204. The collimator 204 narrows an acceptance angle of the solar radiation 208 towards the normal (e.g., substantially perpendicular to the surface at the point of incidence), thereby allowing a narrow beam 210 of solar radiation to pass there through to the detector 206 of the pyranometer 202. Accordingly, the solar radiation of the narrow beam 210 incident upon the detector 206 of the pyranometer 202 can be from the focused source.

Moreover, the pyranometer 202 with the silicon photovoltaic detector (e.g., the detector 206) can have a fast response time. By way of example, the response time of the pyranometer 202 with the silicon photovoltaic detector can have a response time on the order of a tenth of a second or less. According to another example, the response time of the pyranometer 202 can be on the order of 10 µs. However, other response times are intended to fall within the scope of the hereto appended claims. In contrast, other types of sensors can have slower response times. For example, a conventional pyranometer or a conventional pyrheliometer (e.g., with a thermopile sensor) can have a response time on the order of 1 s. According to an illustration, the fast response time of the pyranometer 202 allows for measuring variations in irradiance resulting from vibration of a heliostat in windy conditions. On the contrary, a sensor that has a slower response time may be unable to react quickly enough to capture such variations in irradiance due to vibration of the heliostat in windy conditions.

Figure 3:
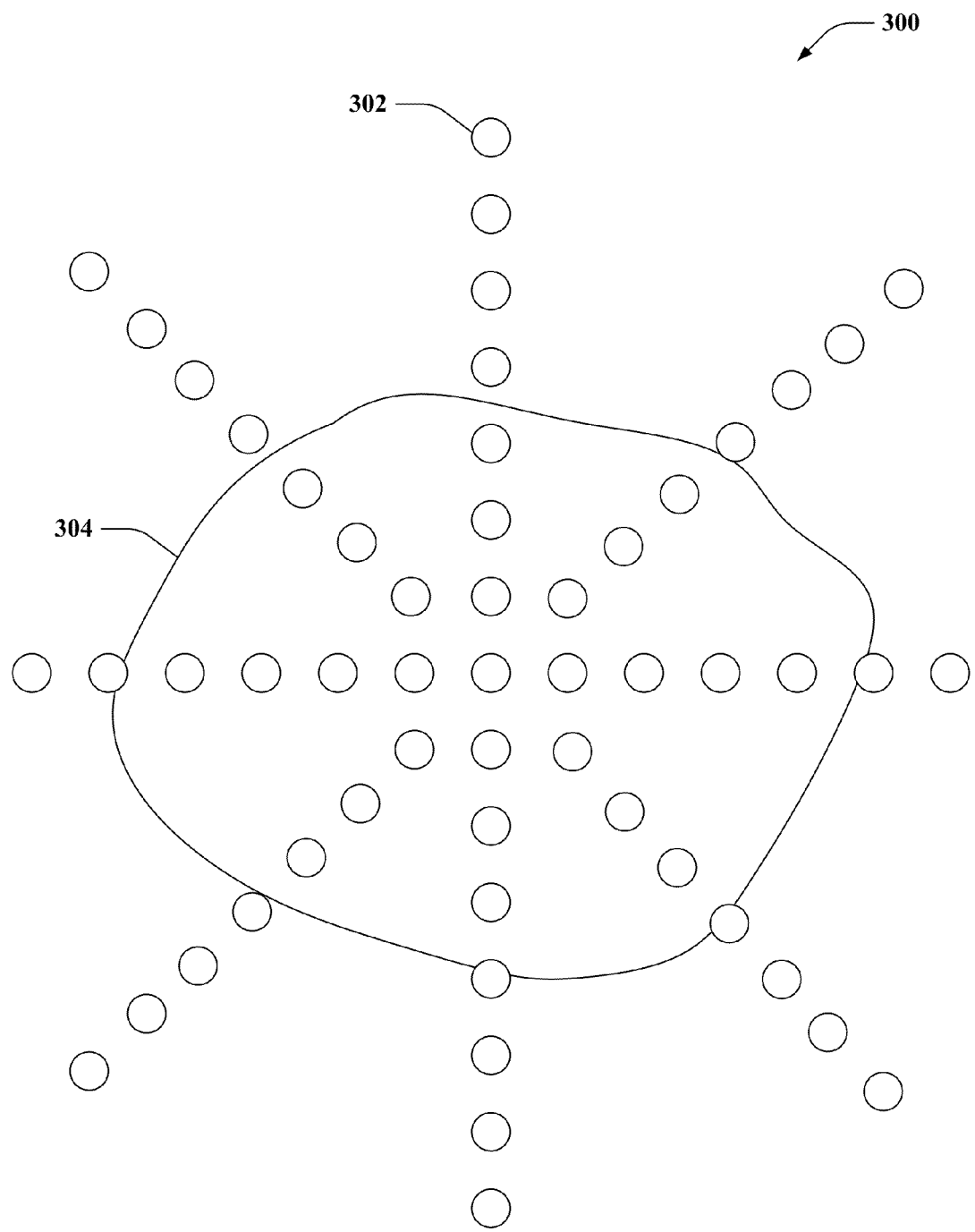
FIG. 3 illustrates an exemplary array of sensors operable to evaluate a quality of a beam from a heliostat.

With reference to FIG. 3, illustrated is an exemplary array 300 of sensors operable to evaluate a quality of a beam from a heliostat. The array 300 includes a plurality of sensors (e.g., sensor 302, etc.) arranged in a radial manner. However, it is contemplated that substantially any other arrangement of the sensors is intended to fall within the scope of the hereto appended claims. For instance, other exemplary arrangements include a cross-shaped array, an X-shaped array, an array with M columns and N rows, or the like. Moreover, although not shown, it is to be appreciated that the array 300 is mounted upon a portable target (e.g., the portable target 106 of FIG. 1).

The sensors in the array 300 are arranged in a plane that is approximately transverse to a propagation path of a beam 304. For instance, the beam 304 can be reflected by a heliostat. The sensors in the array 300 can evaluate a profile of the beam 304. Thus, the sensors in the array 300 can each directly measure irradiance of a portion of the beam 304 respectively incident thereupon and output a respective value corresponding to the measured irradiance. The outputted values can thereafter be employed by a computing device (e.g., the computing device 110 of FIG. 1) as described herein.

According to an example, the sensors in the array 300 can be calibrated by pointing the array 300 at the sun. For instance, the array 300 can be directed towards the sun when the sun is rising or setting; however, it is further contemplated that the array 300 can be angled towards the sun in any other manner. Further, the sensors in the array 300 can be calibrated to read the same direct normal irradiance (DNI) values. Moreover, it is contemplated that the sensors in the array 300 can be periodically recalibrated; yet, the claimed subject matter is not so limited.

Figure 4:
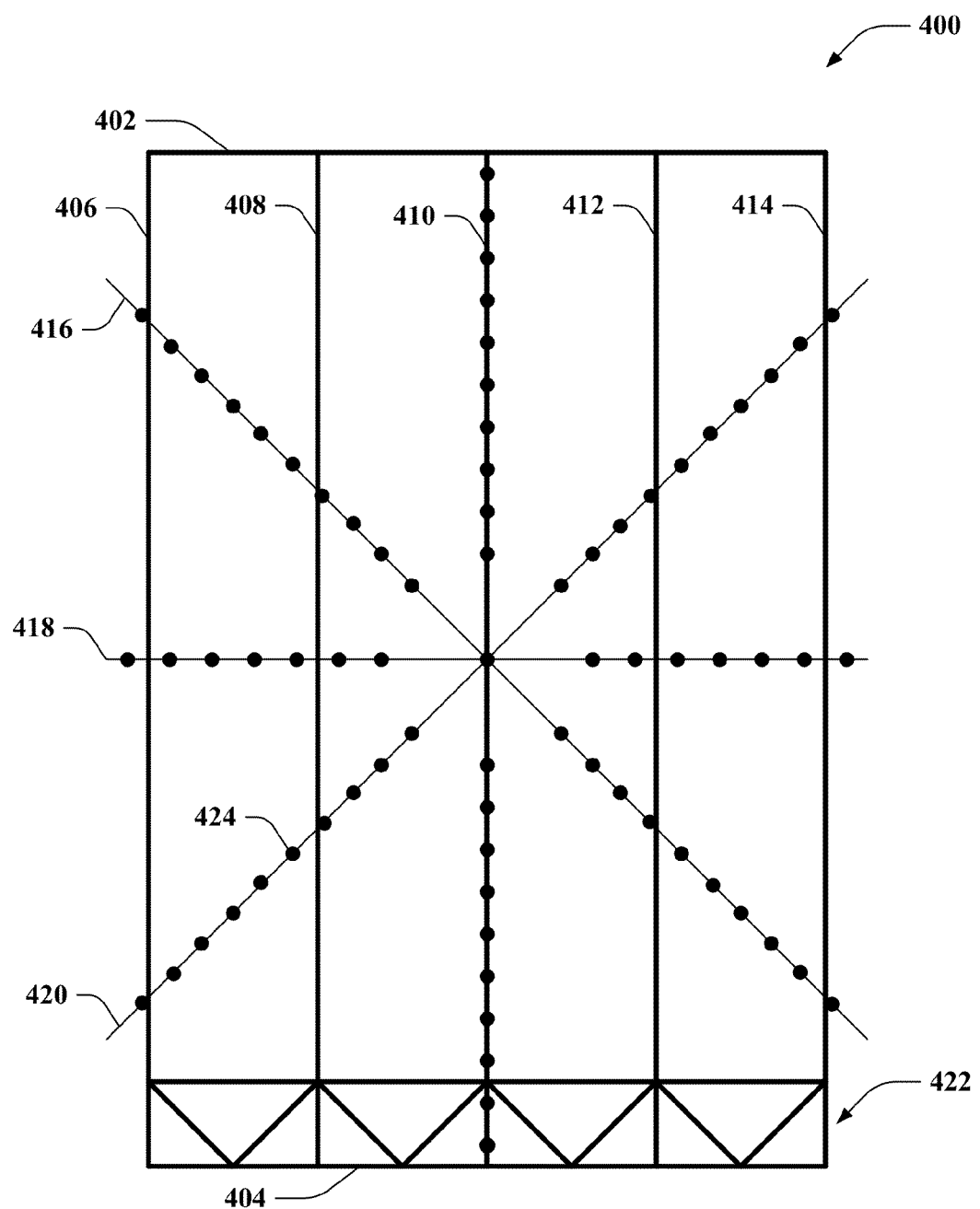
FIG. 4 illustrates a front view of an exemplary portable target.
Figure 5:
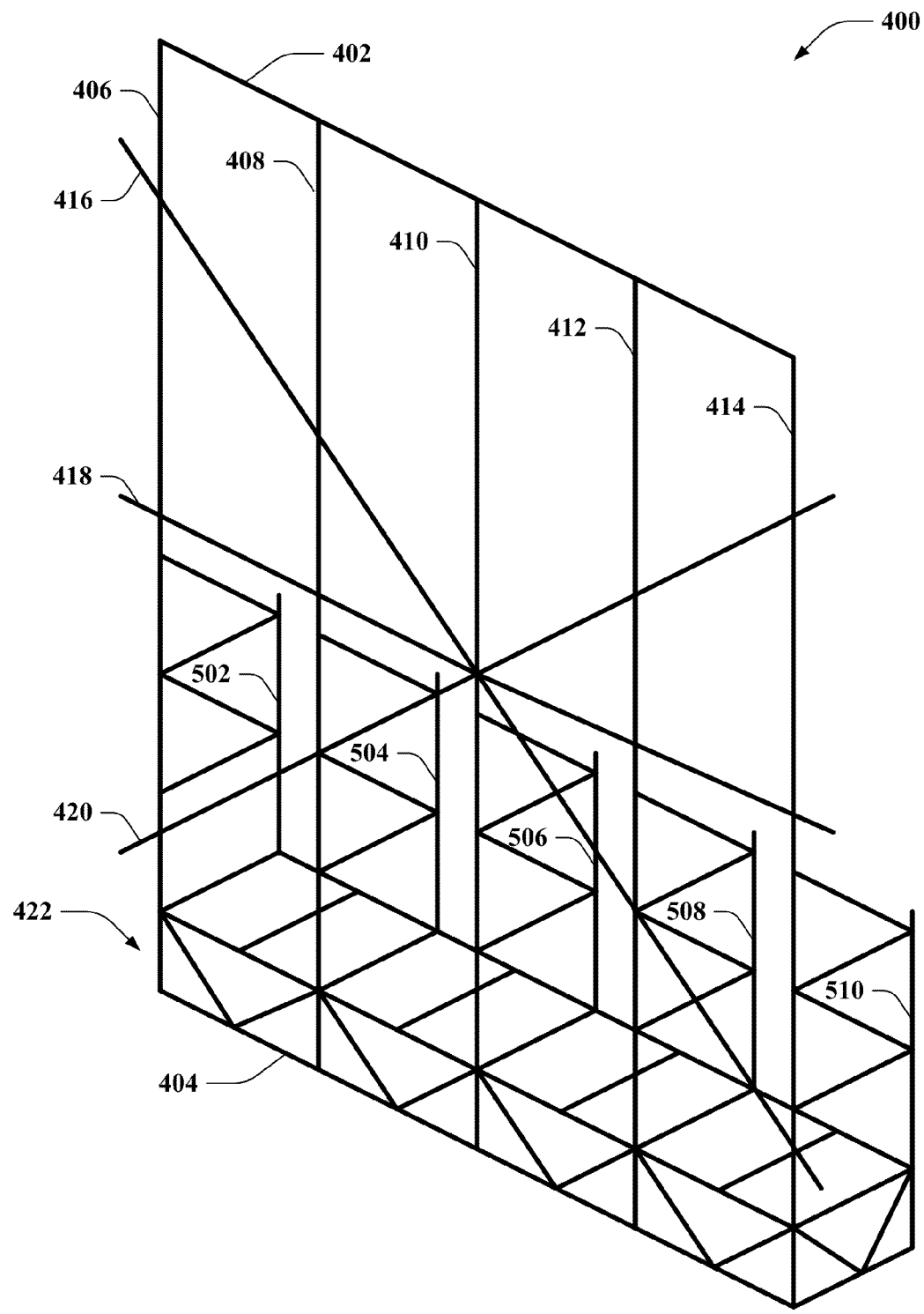
FIG. 5 illustrates a perspective view of the exemplary portable target of FIG. 4.
Figure 6:
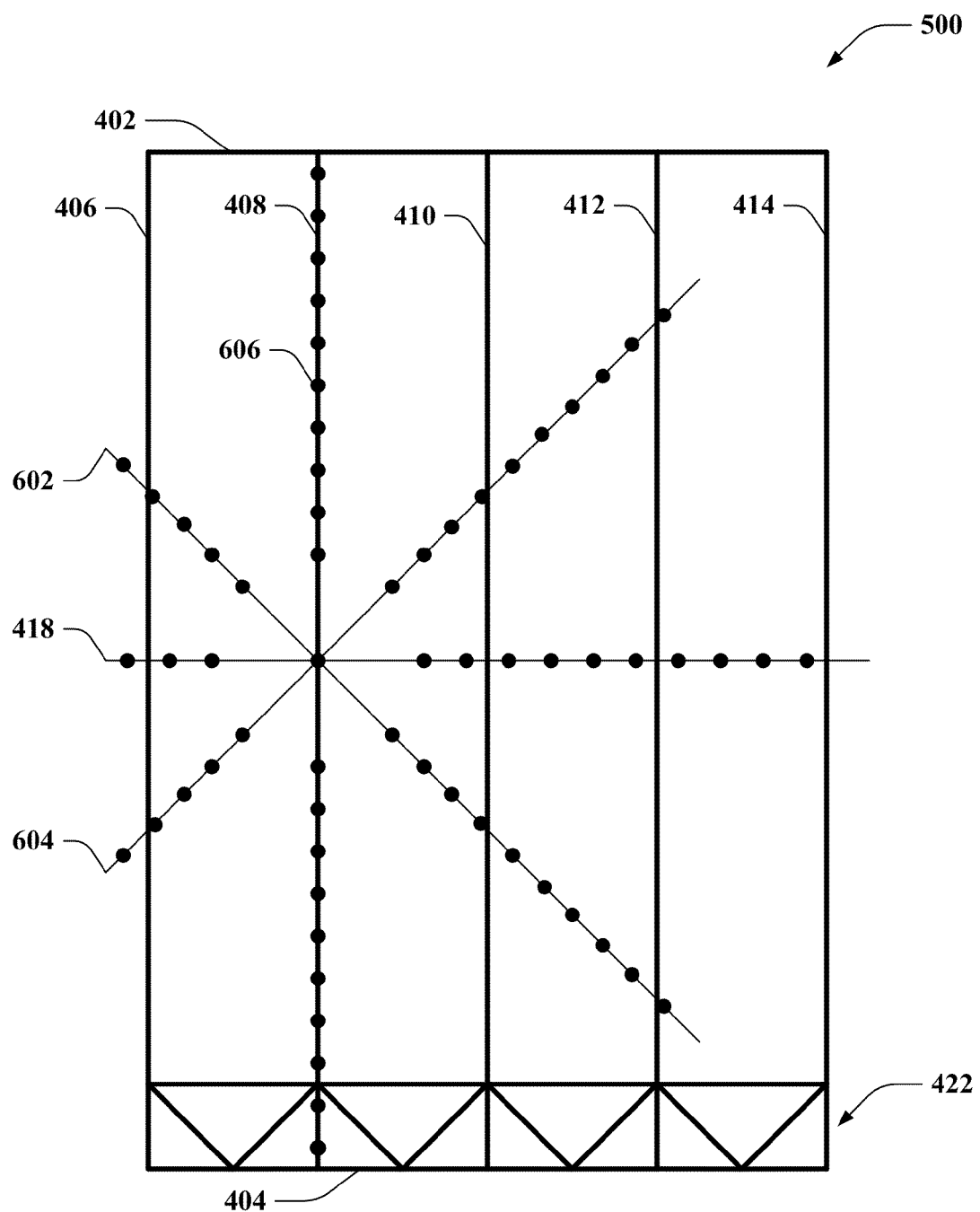
FIG. 6 illustrates a front view of another exemplary portable target.

FIGS. 4-6 depict exemplary portable targets that can include a plurality of sensors. It is to be appreciated that the portable targets described in FIGS. 4-6 are presented for illustration purposes, and other portable targets are intended to fall within the scope of the hereto appended claims. For example, a portable target can have different dimensions, shapes, number or types of members, number or arrangement of sensors, or the like as compared to the portable targets illustrated in FIGS. 4-6. Turning to FIG. 4, illustrated is a front view of an exemplary portable target 400. The portable target 400 includes a top member 402 and a bottom member 404. Moreover, the portable target 400 includes five vertical members vertical member 406, vertical member 408, vertical member 410, vertical member 412, and vertical member 414 (collectively referred to as vertical members 406-414). The five vertical members 406-414 are respectively attached to the top member 402 and the bottom member 404. While the portable target 400 depicted in FIG. 4 includes five vertical members 406-414, it is contemplated that a portable target can include three or more vertical members respectively attached to the top member 402 and the bottom member 404. According to an example, the vertical members 406-414 can be made of square tubing (e.g., steel, aluminum, etc.). However, it is to be appreciated that the claimed subject matter is not limited to the foregoing example.

Further, the portable target 400 includes three radial members: radial member 416, radial member 418, and radial member 420 (collectively referred to as radial members 416-420). The radial members 416-420 are respectively attached to the five vertical members 406-414. While the portable target 400 depicted in FIG. 4 includes three radial members 416-420, it is contemplated that a portable target can include one or more radial members respectively attached to at least two of the vertical members 406-414. By way of example, the radial members 416-420 can be strut channels (e.g., steel, aluminum, etc.). Yet, it is to be appreciated that the claimed subject matter is not limited to the above-noted example.

The radial members 416-420 stabilize the vertical members 406-414 of the portable target 400. Thus, according to an illustration, if utilized in a windy environment (e.g., winds up to 35 mph), the radial members 416-420 can mitigate deflections in the portable target 400. In contrast, a conventional flat screen target used with the traditional photographic flux image technique is oftentimes susceptible to deflection due to winds.

By way of example, the portable target 400 can be mounted on a flatbed trailer (not shown). Following this example, the bottom member 404 can be included in a base 422 of the portable target 400. Moreover, the base 422 of the portable target 400 can be coupled to the flatbed trailer. Mounting the portable target 400 on the flatbed trailer allows the portable target 400 to be moved to measure a characteristic of a beam reflected by a heliostat (e.g., the heliostat 102 of FIG. 1) at various distances between the heliostat and the portable target 400.

According to an example, the portable target 400 can be approximately 60 feet high by 40 feet wide (e.g., the vertical members 406-414 can be approximately 60 feet high, and the top member 402 and the bottom member 404 can be approximately 40 feet wide). Following this example, the portable target 400 can be mounted on a 40 foot flatbed trailer. However, it is to be appreciated that the portable target 400 can have substantially any other dimensions. Moreover, it is contemplated that the portable target 400 need not have a rectangular shape as illustrated in FIG. 4.

Further, it is to be appreciated that the portable target 400 need not be mounted on a flatbed trailer. According to an example, the portable target 400 can be attachable to a solar power tower, a radio tower, or the like. Following this example, the portable target 400 can be moved from a first tower to a second tower, repositioned on a tower, and so forth.

Further, an array of sensors (e.g., sensor 424, etc.) is attached to the portable target 400. As depicted, the sensors are mounted on the portable target 400 to form a radial array that is centered on the vertical member 410 and the radial member 418. The radial members 416-420 can serve as mounting locations for the sensors (or a subset of the sensors). According to the depicted example, a first subset of the sensors are mounted on the radial members 416-420, and a second subset of the sensors are mounted on the vertical member 410. By way of another example (not shown), the set of sensors can be mounted on the radial members 416-420 (e.g., an X-shaped array can include sensors mounted on the radial member 416 and the radial member 420, etc.). Pursuant to a further example, a member (e.g., strut channel) substantially similar to the radial members 416-420 can be vertically positioned nearby or attached to the vertical member 410, or the vertical member 410 can be replaced by a member (e.g., strut channel) substantially similar to the radial members 416-420, and the member substantially similar to the radial member 416-420 along with the radial members 416-420 can serve as mounting locations for the set of sensors.

Now turning to FIG. 5, illustrated is a perspective view of the exemplary portable target 400 of FIG. 4. The portable target 400 is depicted in FIG. 5 without showing the sensors mounted thereupon. As depicted, the portable target 400 can further include vertical stabilization members: vertical stabilization member 502, vertical stabilization member 504, vertical stabilization member 506, vertical stabilization member 508, and vertical stabilization member 510 (collectively referred to as vertical stabilization members 502-510). Moreover, a first set of support members can be respectively attached to the vertical member 406 and the vertical stabilization member 502, a second set of support members can be respectively attached to the vertical member 408 and the vertical stabilization member 504, a third set of support members can be respectively attached to the vertical member 410 and the vertical stabilization member 506, a fourth set of support members can be respectively attached to the vertical member 412 and the vertical stabilization member 508, and a fifth set of support members can be respectively attached to the vertical member 414 and the vertical stabilization member 510. The vertical stabilization members 502-510 and the support members can further stabilize the portable target 400 to mitigate deflections in the target 400.

Referring to FIG. 6, illustrated is a front view of another exemplary portable target 600. The portable target 600 includes the top member 402, the bottom member 404, the vertical members 406-414, and the radial member 418. Moreover, the portable target 600 includes a radial member 602 attached to the vertical member 406, the vertical member 408, the vertical member 410, and the vertical member 412. Further, the portable target 600 includes a radial member 604 attached to the vertical member 406, the vertical member 408, the vertical member 410, and the vertical member 412. Similar to the radial members 416 and 420 of FIG. 4, the radial member 602 and 604 can be strut channels (e.g., steel, aluminum, etc.), for example; however, it is contemplated that the claimed subject matter is not limited to the foregoing example.

Moreover, an array of sensors (e.g., sensor 606, etc.) is attached to the portable target 600. As shown, the sensors are mounted on the portable target 600 to form a radial array that is centered on the vertical member 408 and the radial member 418. It is to be appreciated, however, that the claimed subject matter is not limited to the position of the radial arrays shown in FIGS. 4 and 6. Again, similar as described above with respect to the portable terminal 400 of FIG. 4, the radial members 418, 602, and 604 can serve as mounting locations for the sensors (or a subset of the sensors).

Figure 7:
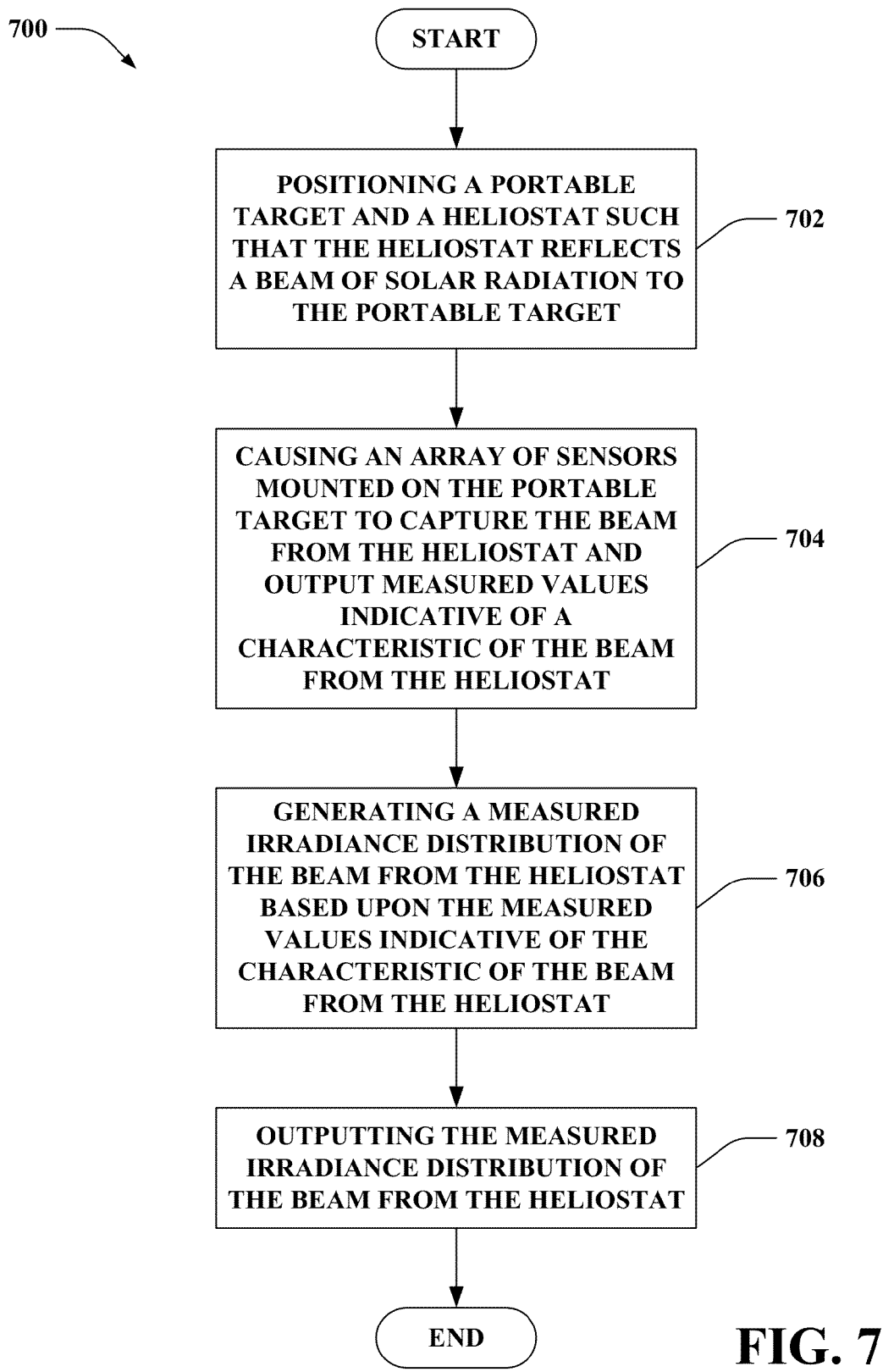
FIG. 7 is a flow diagram that illustrates an exemplary methodology for evaluating quality of a beam reflected by a heliostat.
Figure 8:
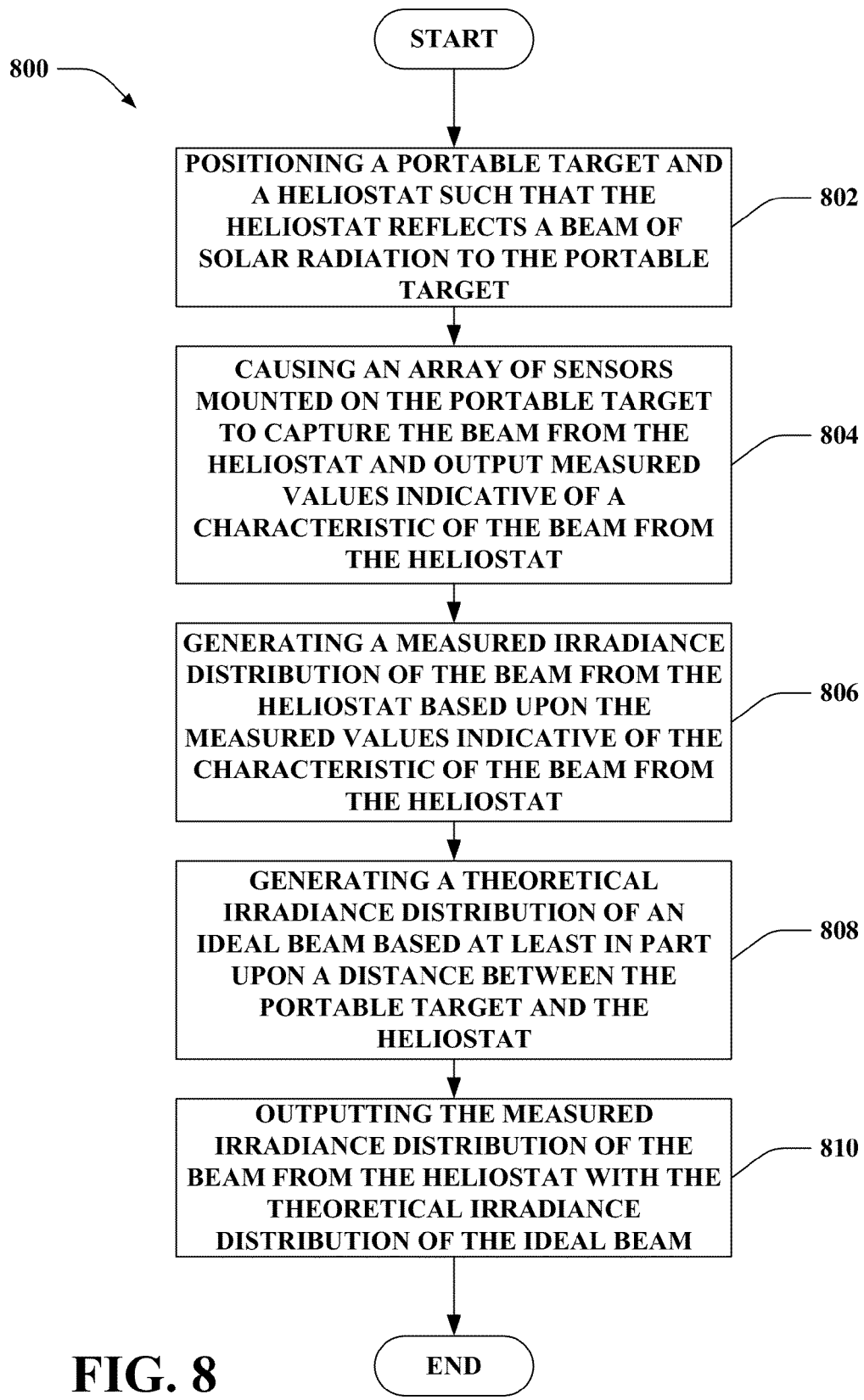
FIG. 8 is a flow diagram that illustrates another exemplary methodology for evaluating quality of a beam reflected by a heliostat.

FIGS. 7-8 illustrate exemplary methodologies relating to evaluating a beam reflected by a heliostat using a portable target. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 for evaluating quality of a beam reflected by a heliostat. At 702, a portable target and a heliostat can be positioned such that the heliostat reflects a beam of solar radiation to the portable target. For instance, the portable target and the heliostat can be positioned to be separated by at least one half of a mile. According to another example, the portable target and the heliostat can be positioned to be separated by at least one mile.

At 704, an array of sensors mounted on the portable target can be caused to capture the beam from the heliostat and output measured values indicative of a characteristic of the beam from the heliostat. The array can include substantially any number of sensors. Further, the array can have substantially any arrangement. By way of example, the array of sensors can comprise a plurality of silicon-detector-based collimated pyranometers or a plurality of silicon-detector-based pyrheliometers; yet, it is contemplated that other types of sensors are intended to fall within the scope of the hereto appended claims. According to another example, the characteristic of the beam can be an irradiance of the beam; however, the claimed subject matter is not so limited. At 706, a measured irradiance distribution of the beam from the heliostat can be generated based upon the measured values indicative of the characteristic of the beam from the heliostat. At 708, the measured irradiance distribution of the beam from the heliostat can be outputted. For example, the measured irradiance distribution can be displayed, retained in memory, transmitted, or the like.

With reference to FIG. 8, illustrated is another methodology 800 for evaluating quality of a beam reflected by a heliostat. At 802, a portable target and a heliostat can be positioned such that the heliostat reflects a beam of solar radiation to the portable target. At 804, an array of sensors mounted on the portable target can be caused to capture the beam from the heliostat and output measured values indicative of a characteristic of the beam from the heliostat. At 806, a measured irradiance distribution of the beam from the heliostat can be generated based upon the measured values indicative of the characteristic of the beam from the heliostat. At 808, a theoretical irradiance distribution of an ideal beam can be generated based at least in part upon a distance between the portable target and the heliostat. At 810, the measured irradiance distribution of the beam from the heliostat can be outputted with the theoretical irradiance distribution of the ideal beam.

According to an example, the measured irradiance distribution of the beam from the heliostat and the theoretical irradiance distribution of the ideal beam can be compared. Following this example, information pertaining to performance of the heliostat can be produced at least in part upon the comparison. Further, the information can be outputted along with the measured irradiance distribution of the beam from the heliostat and the theoretical irradiance distribution of the ideal beam. However, it is to be appreciated that the claimed subject matter is not limited to the above-noted example.

Figure 9:
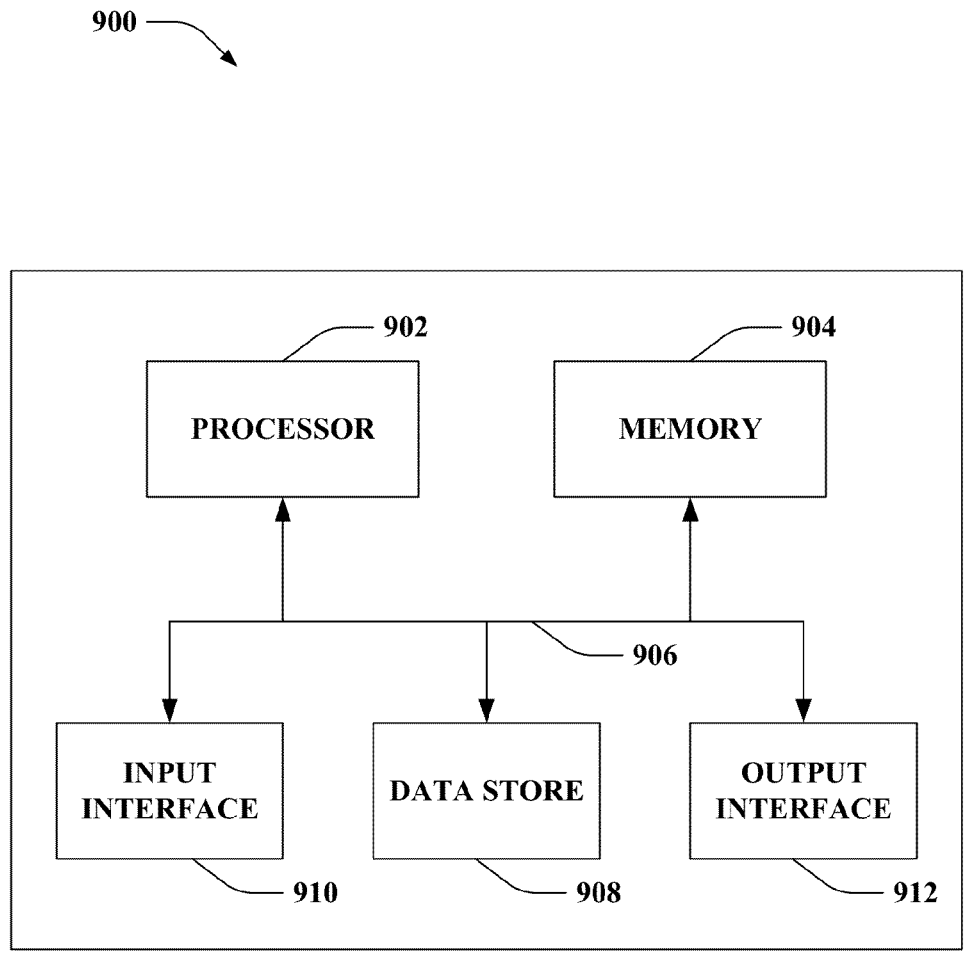
FIG. 9 illustrates an exemplary computing device.

Referring now to FIG. 9, a high-level illustration of an exemplary computing device 900 (e.g., the computing device 110 of FIG. 1) that can be used in accordance with the systems and methodologies disclosed herein is illustrated. For instance, the computing device 900 may be used in a system that evaluates a characteristic of a beam reflected by a heliostat. By way of another example, the computing device 900 can be used in a system that supports generating a theoretical irradiance distribution of a beam reflected by a heliostat. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store measured values from sensors, data indicative of distance between a heliostat and a portable target, data related to orientation of the heliostat with respect to the portable target, data related to time of day, data related to geographic location, data corresponding to the beam, information pertaining to performance of the heliostat, etc.

The computing device 900 additionally includes a data store 908 that is accessible by the processor 902 by way of the system bus 906. The data store 908 may include executable instructions, measured values from sensors, data indicative of distance between a heliostat and a portable target, data related to orientation of the heliostat with respect to the portable target, data related to time of day, data related to geographic location, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An apparatus, comprising:
   a portable target; and
   a plurality of sensors affixed to the portable target, the plurality of sensors are configured to capture a beam reflected by a heliostat and output measured values indicative of a characteristic of the beam reflected by the heliostat, wherein the characteristic of the beam is an irradiance of the beam reflected by the heliostat.

2. The apparatus of claim 1, the plurality of sensors comprises a plurality of silicon-detector-based collimated pyranometers or a plurality of silicon-detector-based pyrheliometers.

3. The apparatus of claim 1, wherein the plurality of sensors measure direct normal irradiances of the beam reflected by the heliostat.

4. The apparatus of claim 1, the portable target further comprises;
   a top member;
   a bottom member;
   three or more vertical members respectively attached to the top member and the bottom member; and
   one or more radial members respectively attached to at least two of the vertical members;
   wherein at least a first subset of the plurality of sensors are mounted on the one or more radial members.

5. The apparatus of claim 4, wherein a second subset of the plurality of sensors are mounted on at least one of the three or more vertical members.

6. The apparatus of claim 1, wherein the portable target is mounted on a flatbed trailer.

7. A system, comprising:
   a heliostat;
   a portable target that includes an array of sensors configured to capture a beam reflected by the heliostat and output measured values indicative of a characteristic of the beam reflected by the heliostat; and
   a computing device that receives the measured values indicative of the characteristic of the beam reflected by the heliostat from the sensors, generates data corresponding to the beam reflected by the heliostat based on the measured values indicative of the characteristic of the beam, and outputs the data corresponding to the beam reflected by the heliostat, wherein the characteristic of the beam reflected by the heliostat is an irradiance of the beam reflected by the heliostat.

8. The system of claim 7, the array of sensors comprises a plurality of silicon detector-based collimated pyranometers or a plurality of silicon-detector-based pyrheliometers.

9. The system of claim 7, wherein the heliostat and the portable target are separated by at least one half of a mile.

10. The system of claim 7, wherein the heliostat and the portable target are separated by at least one mile.

11. The system of claim 7, wherein the data corresponding to the beam reflected by the heliostat is at least one of a peak irradiance of the beam, a total power of the beam, an average irradiance of the beam, an average power of the beam, an irradiance distribution of the beam, or a centroid of the beam.

12. The system of claim 7, wherein the computing device generates a measured irradiance distribution based on the measured values indicative of the characteristic of the beam and a theoretical irradiance distribution of an ideal beam.

13. The system of claim 12, further comprising a display monitor that displays a visual representation of the measured irradiance distribution of the beam and the theoretical irradiance distribution of the ideal beam.

14. The system of claim 12, wherein the computing device further performs a comparison between the measured irradiance distribution of the beam and the theoretical irradiance distribution of the ideal beam, and outputs information pertaining to performance of the heliostat based at least in part upon the comparison.

15. The system of claim 14, wherein the heliostat further comprises an actuator that is operative to adjust at least one of the heliostat or mirror facets of the heliostat, and wherein the heliostat is configured to receive the information and automatically adjust the at least one of the heliostat or the mirror facets of the heliostat via the actuator responsive to receipt of the information for aligning, focusing, or adjusting the at least one of the heliostat or the mirror facets of the heliostat.

16. A method comprising:
    positioning a portable target and a heliostat such that the heliostat reflects a beam of solar radiation to the portable target;
    causing an array of sensors mounted on the portable target to capture the beam from the heliostat and output measured values indicative, of a characteristic of the beam from the heliostat;
    generating a measured irradiance distribution of the beam from the heliostat based upon the measured values indicative of the characteristic of the beam from the heliostat; and
    outputting the measured irradiance distribution of the beam from the heliostat.

17. The method of claim 16, wherein the portable target and the heliostat are positioned to be separated by at least one half of a mile.

18. The method of claim 16, wherein the array of sensors comprises a plurality of silicon-detector-based collimated pyranometers or a plurality of silicon-detector-based pyrheliometers.

19. The method of claim 16, further comprising:
    generating a theoretical irradiance distribution of an ideal beam based at least in part upon a distance between the portable target and the heliostat; and
    outputting the theoretical irradiance distribution of the ideal beam with the measured irradiance distribution of the beam from the heliostat.

* * * * *